Jan. 5, 1954     K. KREIBICH     2,664,830
TRACKLESS VEHICLE DRIVEN BY ELECTRIC MOTORS
Filed Feb. 5, 1948     2 Sheets-Sheet 1
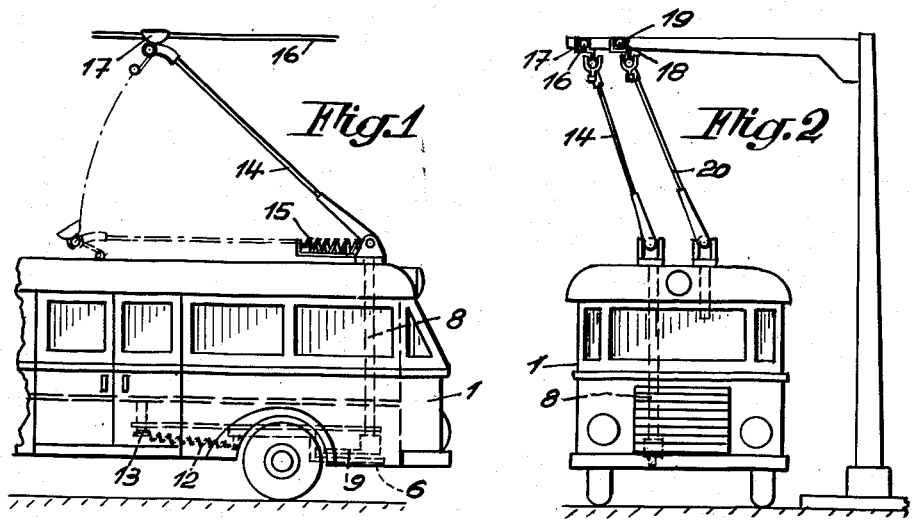
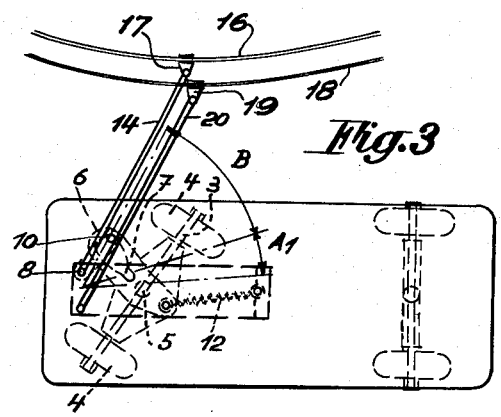
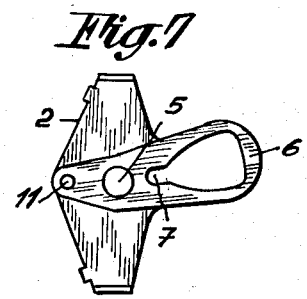
INVENTOR.
Karl Kreibach
BY Jan. 5, 1954　　　　　　　K. KREIBICH　　　　　　2,664,830
TRACKLESS VEHICLE DRIVEN BY ELECTRIC MOTORS
Filed Feb. 5, 1948　　　　　　　　　　　　　　2 Sheets-Sheet 2

INVENTOR.
Karl Kreibich
BY

Patented Jan. 5, 1954

2,664,830

UNITED STATES PATENT OFFICE 2,664,830

TRACKLESS VEHICLE DRIVEN BY ELECTRIC MOTORS

Karl Kreibich, Vienna, Austria, assignor to "Rivarossi" Officine Miniature Elettroferroviarie Soc. Acc. Semplice A. Rossi & F. Brunner, Como, Italy, an Italian company Application February 5, 1948, Serial No. 6,449

2 Claims. (Cl. 104—247)

The invention relates to a trackless vehicle driven by electric motors having a contacting arm, gliding on the overhead wire, said arm operatively compelling the steering gear of the vehicle wheels to follow the direction of the overhead wire by means of a control device connected to same.

The invention provides for a control composed of but two mechanical control elements permanently in mesh with each other, said controlling device warranting a shock-free operation, entailing but very low prime costs, not requiring an attendance of any kind, and being distinguished by a very long life. This basic thought of the invention has been realized by the control device, consisting of two controlling arms tiltably supported by two axles facing each other, and crossing in tilting, of which the one is directly connected to the steering gear of the vehicle, and is provided with a control slot passing into a no-effect arc, whereas the other control arm is connected by the axle to the contact arm sliding on the overhead line, permanently engaging, with a control bolt, into the control slot of the control arm of the steering gear, and operatively transmitting its movement to the latter.

According to a further development of the invention the control arm, operating the steering gear, is subject to the action of a spring whose task it is to eliminate the play in the members of the transmission, and to compensate, independently of the steering gear, the small deviations of the contact arm gliding on the overhead line.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 1 is a side elevation of a trolley bus according to the present invention;

Fig. 2 is a front elevation of the trolley bus shown in Fig. 1;

Fig. 3 is a plan view of the trolley bus shown in Fig. 1 in the position of extreme deviation from the direction of the overhead line;

Fig. 7 shows separately a part of Figs. 4, 5 and 6.

Figure 4:
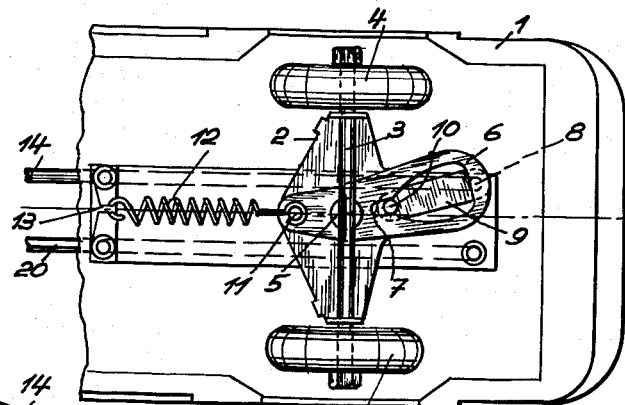
Fig. 4 shows at a larger scale, the steering system seen from below in a normal position for a straight course.

The steering gear of the vehicle 1 is composed of the bogie 2, the wheel axle 3 journaled in it, and the wheels 4, and the bogie is pivotable in a horizontal plane about a vertical axis 5. The control device is composed of a control arm or lever 6 (termed hereinafter the second lever) made into one piece with the bogie 2 and having the longitudinal slot 7 (Figure 7), a control lever 9 (termed hereinafter the first lever) fastened to a vertical tilting shaft 8, in the present embodiment passing through the vehicle, and reaching beyond the roof thereof, said lever engaging the longitudinal slot 7 of the control lever 6 by means of a bolt or pin 10, preferably having a roller. The tilting axle 5 of the control arm 6 and the tilting axle 8 of the control lever 9 are spaced at a distance of about the length of one arm of the lever 6, so that the tilting ranges of the two control levers 6 and 9 are made to cross. The second lever arm of the lever 6 is provided with a holding pin 11 or an eye for engaging the return spring which with its other end engages a fastening clip 13 fixed to the lower side of the vehicle. By the tilting axle 8 the control lever 9 is operatively connected to the contact arm 14 arranged on the roof of the vehicle, said arm tilting about the axle 8 and being pressed with its contact shoe 17, by the spring 15, against the electric conductor 16 of the overhead line. During the drive the contact arm 14 glides with its contact shoe 17 on the one conductor 16 of the overhead line, whereas the second conductor 18 contacts the shoe 19 of the second contact arm 20. The second contact arm 20 is arranged in parallel to the first mentioned contact arm 14, and is likewise tiltable about an axle of its own. The contact shoes 17 and 19 are so tiltably supported at the ends of the contact arms 14, 20 that in case of the contact arms tilting in the horizontal plane, they remain in contact with the overhead wires, and retain their sliding position. In order to secure the engagement of the contact shoes 17, 19 with the overhead line 16, 18 the shoes are channel-shaped in their cross-section and provided with high channel sides or shanks, so that they cannot detach themselves from the overhead line even in case of a very considerable deviation of the contact arms 14, 20. Consequently, the electric connection of the vehicle motor to the overhead line will never be interrupted.

Figure 5:
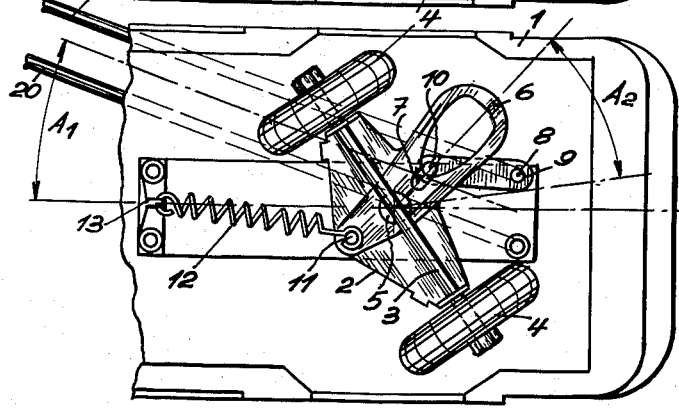
Fig. 5 is a view similar to Fig. 4 with the steering system in the position of maximum deflection of the front wheels and normal deflection of the swingable contact arm.

The mode of operation of the present vehicle control by means of the overhead line is the following:

In case of a drive straight ahead the steering gear and the control device occupy the position indicated in Fig. 4. If, however, the vehicle deviates from the direction prescribed by the overhead line, an angle develops between the direction prescribed and the actual driving direction, causing the two contact arms 14, 20 to tilt, the importance of the tilting movement being proportional to the size of the angle. By the tilting of the two contact arms 14 and 20 the control lever 9 and the control arm 6 are also operatively tilted, resulting in a more or less considerable obliquity of the steering gear to the extent $A_1$ as shown in Fig. 5, the lever 6 making an angle $A_2$ with the normal position thereof.

Figure 6:
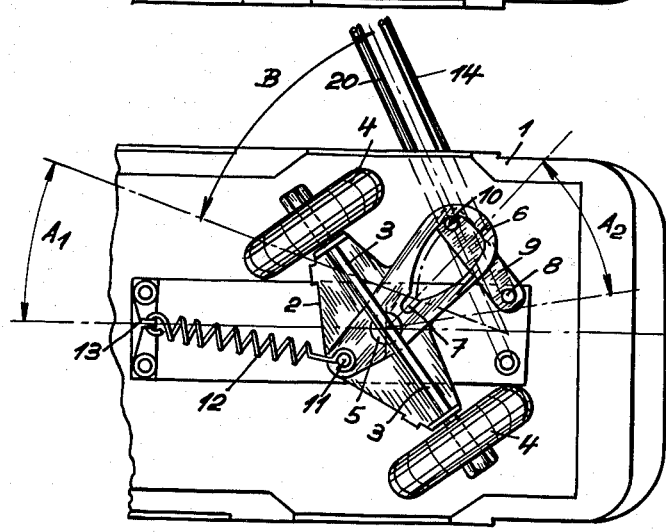
Fig. 6 is a view similar to Figs. 4 and 5 showing the steering system in a position in which the angular movement of the contact arm exceeds considerably the maximum deflection of the wheels.

In case the vehicle considerably deviates from the direction according to the overhead line 16, 18 e. g. owing to the wheels laterally gliding off on the road, care has been taken to see that the contact arms 14, 20 are tiltable, but without any effect, to the extent B beyond the maximum obliquity $A_1$ of the wheels (Fig. 6), so as to uphold in any case the connection of the vehicle with the overhead line. For this purpose the longitudinal slot 7 of the control arm 6 has circular arc-shaped parts adjoining the straight portion (Fig. 7), whereby the radius of the circular arcs corresponds approximately to the radial distance of the control pin 10 of the control lever 9, whereby the centre of the arc coincides with the tilting axle 8 of the control lever 9 when reaching the maximum obliquity extent $A_1$ of the steering gears. Consequently, in case of a tilting motion of the contact arm 14, exceeding the obliquity extent $A_1$ of the steering gear, a tilting of the control lever 9 and a movement of the bolt 10 takes place having no influence on the obliquity extent $A_1$ of the steering gear. However, the contact shoes 17 and 19 of the contact arms 14 and 20 permanently remain in electrical connection with the overhead line 16, 18, so that the vehicle is not separated from the overhead line. If desired, the contact arms 14 and 20 can be separated from the overhead line by tilting them down on to the vehicle roof in a manner known.

What I claim is:

1. An electrically operated vehicle comprising, in combination, a bogie supporting one end of the vehicle and consisting of a single, two-wheeled axle of said bogie pivotable about a vertical axis; a rotatable shaft held in spaced, parallel relation to the vertical axis of said bogie; a first substantially horizontal lever being integral with one end of said shaft; a pin rigidly connected to said first lever, said pin being arranged at a distance apart from said shaft; a second substantially horizontal lever being integral with the frame of said bogie and extending forwardly thereof, said second lever having a slot engaged by said pin, said slot including a straight end portion corresponding in width to the diameter of said pin, and a main portion including two oppositely arranged circular arcs, whereby said pin engages said end portion of said slot when said first lever swings within a predetermined angle so that said second lever carries out a rocking motion with respect to the body of the vehicle, whereas at a swinging motion of the first lever exceeding the predetermined angle said pin engages one of said circular arcs so that said second lever is unaffected by the swinging motion of said first lever.

2. An electrically operated vehicle comprising, in combination, a bogie supporting one end of the vehicle and consisting of a single, two-wheeled axle of said bogie pivotable about a vertical axis; a rotatable shaft held in spaced, parallel relation to the vertical axis of said bogie; a trolley contact arm secured to said shaft; a first substantially horizontal lever being integral with one end of said shaft; a pin rigidly connected to said first lever, said pin being arranged at a distance apart from said shaft; a second substantially horizontal lever being integral with the frame of said bogie and extending forwardly thereof, said second lever having a slot engaged by said pin, said slot including a straight end portion corresponding in width to the diameter of said pin, and a main portion including two oppositely arranged circular arcs; resilient means connected to said second lever and urging the same into a middle position thereof in which said pin is in engagement with said straight end portion of said slot, whereby said pin engages said end portion of said slot when said first lever swings within a predetermined angle so that said second lever carries out a rocking motion with respect to the body of the vehicle, whereas at a swinging motion of the first lever exceeding the predetermined angle, said pin engages one of said circular arcs so that said second lever is unaffected by the swinging motion of said first lever.

KARL KREIBICH.

References Cited in the file of this patent

UNITED STATES PATENTS

| Number | Name | Date |
|---|---|---|
| 406,391 | Dibble | July 2, 1889 |
| 1,972,333 | Fageol | Sept. 4, 1934 |
| 2,125,590 | Smallwood | Aug. 2, 1938 |

FOREIGN PATENTS

| Number | Country | Date |
|---|---|---|
| 321,238 | Italy | Sept. 27, 1934 |
| 31,527 | Switzerland | May 8, 1904 |